United States Patent [19]

Ueyama et al.

[11] Patent Number: 5,113,209
[45] Date of Patent: May 12, 1992

[54] DEVICE FOR DETECTING PHOTOGRAPHIC DISTANCE OR IMAGE MAGNIFICATION AND PHOTOGRAPHIC LENS TO BE ATTACHED THERETO

[75] Inventors: Masayuki Ueyama; Kenji Tsuji, both of Osaka, Japan

[73] Assignee: Minolta Camera Kabushiki Kaisha, Osaka, Japan

[21] Appl. No.: 559,408

[22] Filed: Jul. 26, 1990

Related U.S. Application Data

[63] Continuation of Ser. No. 239,285, Sep. 1, 1988, abandoned.

[30] Foreign Application Priority Data

Sep. 2, 1987 [JP] Japan ............................ 62-221135
Sep. 2, 1987 [JP] Japan ............................ 62-221136

[51] Int. Cl.$^5$ .......................................... G03B 13/36
[52] U.S. Cl. ............................. 354/400; 354/402
[58] Field of Search ............................. 354/400, 402

[56] References Cited

U.S. PATENT DOCUMENTS

| | | | |
|---|---|---|---|
| 4,348,089 | 9/1982 | Shenk | 354/400 |
| 4,537,487 | 8/1985 | Taniguchi et al. | 354/400 |
| 4,650,309 | 3/1987 | Ishida et al. | 354/402 |
| 4,743,931 | 5/1988 | Matsuzaki et al. | 354/400 |
| 4,743,931 | 5/1988 | Matsuzaki et al. | 354/400 |
| 4,772,912 | 9/1988 | Ishida et al. | 354/402 |

FOREIGN PATENT DOCUMENTS

| | | |
|---|---|---|
| 50-115524 | 9/1975 | Japan. |
| 58-150921 | 9/1983 | Japan. |
| 59-123822 | 7/1984 | Japan. |
| 62-198809 | 9/1987 | Japan. |
| 62-264032 | 11/1987 | Japan. |
| 63-155131 | 6/1988 | Japan. |

Primary Examiner—Russell E. Adams
Attorney, Agent, or Firm—Burns, Doane, Swecker & Mathis

[57] ABSTRACT

A device is so constructed as to highly accurately detect the photographic distance or the image magnification data by correcting output data of a position detecting means based on the amount of difference between the basic positions of the position detecting means and a focus detecting means. A photographic lens is attached to the device for detecting the photographic distance and the image magnification, which issues data for correcting the output data of the position detecting means.

14 Claims, 4 Drawing Sheets

DEVICE FOR DETECTING PHOTOGRAPHIC DISTANCE OR IMAGE MAGNIFICATION AND PHOTOGRAPHIC LENS TO BE ATTACHED THERETO

BACKGROUND OF THE INVENTION AND RELATED ART STATEMENT

This application is a continuation of application Ser. No. 07/239,285, filed Sep. 1, 1988, now abandoned.

The present invention relates to a device for detecting the photographic distance or the image magnification used in an autofocusing camera. The word "the photographic distance" here means the distance from a film plane to an object to be photographed.

An autofocusing camera is conventionally known in which a photographic distance data is obtained based on a signal in correspondence with the displacement amount of a focusing lens of a photographic lens from the infinity (hereinafter represented by $\infty$) basic position, for example, by counting pulses generated by detecting a position of the focusing lens, as shown for example, in Japanese Laid-Open Patent Publication (Tokkaisho) No. 59-123822.

Further, in an prior art shown in Japanese Laid-Open Patent Publication No. 58-150921, the photographic distance data is calculated based on the defocus amount signal from a focus detecting means in correspondence with the distance between the expected image forming position and the actual image forming position by a focusing lens of a photographic lens and the focal length of the photographic lens.

In such a kind of a device for detecting the photographic distance or the image magnification using a system of extending a focusing lens from the $\infty$ basic position and retracting the same to the $\infty$ basic position, discoincidence between the $\infty$ basic position of a lens position detecting means and the $\infty$ in-focus basic position a focus detecting means sometimes occurs, which causes an error in the detected value.

The abovementioned discoincidence between the basic position occurs in the following cases.

① When the $\infty$ basic position is not optically on the $\infty$ in-focus position:

This occurs when so-called a lens back varies, for example, due to the temperature change. Further, in the case of a focusing lens having an enough movable scope on the $\infty$ side at the normal temperature so that an " object can be in in-focus even if the lens back varies due to the temperature change or the like, such a discoincidence occurs when the $\infty$ basic position of the position detecting means is set at a limit position of the movable scope.

② Otherwise, when in spite of the $\infty$ basic position of the lens position detecting means precisely coinciding with the optical $\infty$ in-focus position, the optical $\infty$ in-focus position is different from the basic position of the focus detecting means:

This occurs by the influence of the spherical aberration, astigmatism and the like, since, for example, contrary to the best image forming point is determined by considering from the center to the periphery of the photographing scene, the focus detecting means takes into consideration only the center of the photographing scene and besides uses only a part of a bundle of ray of dark or large F number.

SUMMARY OF THE INVENTION

The present invention has been made in view of the abovementioned background.

An object of the present invention is to provide a device for detecting the photographic distance or the image magnification in which the highly accurate photographic distance and image magnification can be obtained by correcting the error between the $\infty$ basic position of a position detecting means for detecting the movement amount of a focusing lens and the $\infty$ in-focus basic position of a focus detecting means for detecting the detecting the focus condition of the focusing lens, at the time of calculating the photographic distance and the image magnification, based on output data from the position detecting means and the focus detecting means, and provide a photographic lens having such a focusing lens to be attached to the device.

According to the present invention, in a device for detecting the photographic distance or the image magnification, comprising a position detecting means for issuing a signal representing the displacement amount of a focusing lens from the $\infty$ basic position, an focus detecting means for issuing a defocus amount signal representing the distance between the expected image forming position and the actual image forming position by the lens, and a calculating means for calculating the photographic distance or the image magnification based on output data of the abovementioned two detecting means, and a correcting means for correcting the output data of the position detecting means based on the difference between the basic positions of the position detecting means and the focus detecting means.

With this arrangement, the output data of the position detecting means is corrected to eliminate any error, whereby correct photographic distance or image magnification can be obtained.

Further, the accuracy of detecting the photographic distance or the image magnification can be surely improved even if focusing a lens of a photographic lens having an enough movable scope on the $\infty$ side, a photographic lens having a lens back varying with the temperature change, or a photographic lens of a large backlash amount is used.

DETAILED DESCRIPTION OF PREFERRED EMBODIMENT OF THE INVENTION

Figure 1:
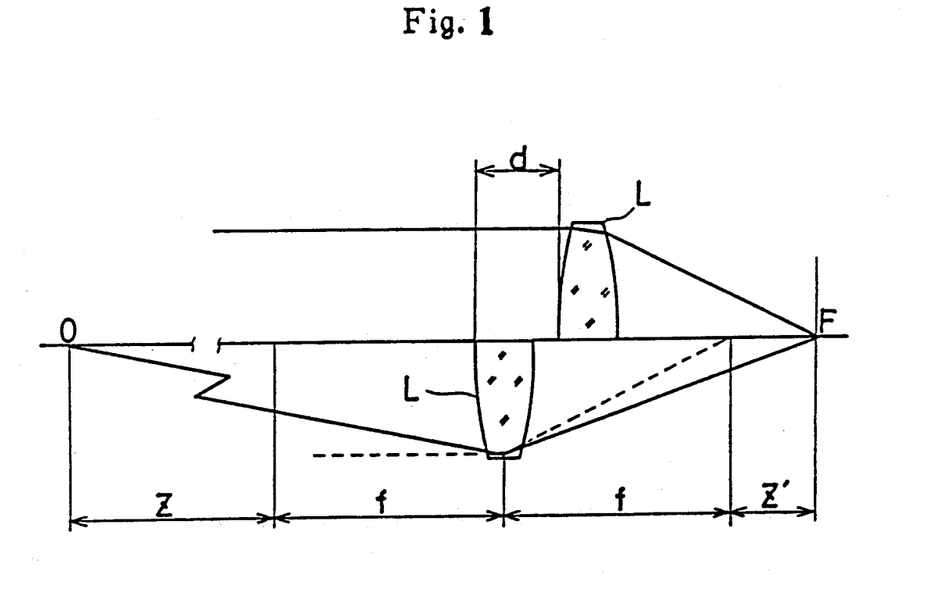
FIG. 1 is a view showing an optical system for explaining the principle of a detecting device according to the present invention.

Now, the principle of the photographic distance detection and the image magnification detection according to the present invention will be described using a integrally extendable lens with reference to FIG. 1. In FIG. 1, the upper part shows the state in which an object at infinite (∞) position is focused on the ∞ basic position F by a lens L, while the lower part shows the state in which an object at a finite position 0 is focused by the lens L.

Relating to the object distance D, the following formula is obtained.

$$Z = f^2/Z'$$

(Z: distance from object 0 to front focal point of the lens L, Z': distance from the " basic position F to rear focal point of the lens L, f: focal length of the lens L)

Since $D \approx Z$, if $Z >> f$ $Z = f^2/Z'$, $$D = f^2/Z' \tag{1}$$

Further, relating to the image magnification $\beta$, $$\beta = Z'/f \tag{2}$$

Here, if the movement (displacement) amount from the ∞ basic position F of the lens L is represented by d, $Z' = d$.

Accordingly, D and $\beta$ can be obtained from the formulas (1), (2) by substituting d and f.

Relating to lenses of types other than the wholly extendable lens, the formulas (1), (2) are also realized if Z, Z' and f are values of the whole optical system. Further, if $D >> f$, generally the following formula is obtained.

$$d = kZ' \tag{3}$$

(k: coefficient determined with each lens)

Consequently, generally the following formulas are obtained.

$$D = f^2/Z' = kf^2/d \tag{4}$$

$$\beta = Z'/f = d/kf \tag{5}$$

Now, a method will be described in which the movement amount d is obtained by the number n of pulse output from a position detecting means which detects movement of the lens L from the ∞ basic position and outputs a pulse each time the lens L means a predetermined amount by using a pulse generator, and then D is obtained from the formula (4).

If the movement amount d of the lens L is represented by using the pulse number n in the following formula $$d = an \tag{6}$$

(a: coefficient determined with each kind of lenses), the following formula is obtained from the formula (4).

$$D = kf^2/an \text{ (mm)}$$

Taking logarithms of both sides, $$2 \log_2(D \times 10^{-3}) = 2 \log_2\{(kf^2/a) \times 10^{-3}\} - 2 \log_2 n \text{ (m)}$$

If $A = 2 \log_2\{(kf^2/a) \times 10^{-3}\}$, and logarithm of D is represented by $D_v$ as an photographic distance data, $$D_v = A - 2 \log_2 n \tag{7}$$

(A: coefficient determined with each kind of lens)

Further, relating to the image magnification, from
$$\beta = d/kf = an/kg$$
and
$$2^{A/2} = (kf^2/a) \times 10^{-3}.$$

the following formula is obtained.

$$\beta = (f \cdot n \times 10^{-3})/(2^{A/2}) \tag{8}$$

d is the extension amount of a lens L from the ∞ basic position. In this report, if there is a difference between the ∞ basic position of the lens position detecting means and the ∞ basic position of a focus detecting means (the position at which an image of the infinite (∞) object is formed when the lens is in the ∞ basic position ... point F in FIG. 1), this causes a detecting error. Such a different is regarded as DF (μm). When an object at a finite distance is put in in-focus by means of the abovementioned focus detecting means, the position detecting means issues a value covering a correct movement amount d plus (or minus) an extra value representing DF in calculating D or $\beta$.

From the formula (3), this extra value $\Delta d$ is represented as follows.

$$\Delta d = k \cdot DF \tag{9}$$

Now, it will be described what influence DF has upon the calculation of the image magnification.

Since $\beta \propto Z'$ from the formula (2), the following formula is obtained relating to an error $\Delta \beta$ caused by DF in calculating the image magnification.

$$\Delta \beta/\beta = DF/Z' = DF/\beta f \tag{10}$$

For example, when $DF = 100\mu m$, $\beta = 1/100$ and $f = 100$ mm, $$\Delta \beta/\beta = 0.1$$

For example, when the optical ∞ in-focus position is different from the basic position of the focus detecting means (abovementioned case ②), various kinds of aberrations change with the extension of a focusing lens of the photographic lens. Accordingly, for making strict correction, DF should be changed with the extension amount. However, the formula (10) indicates that with respect to $\Delta \beta$ allow (%) (the allowable value of $\Delta \beta$), the allowable value of DF increases proportionally as $\beta$ increases, and it is seen that when DF does not change so such with the extension of the focusing lens, the value at ∞ position has only to be corrected. This is the same in calculating the value D.

Consequently, a device for correcting error and detecting precise photographic distance data and image magnification will be described in the following, using data $DF_0$ (DF at normal temperature at the ∞ position), $\Delta DF_t$ (temperature coefficient of DF, and BL (backlash amount of the position detecting means and the focusing lens), with reference to an embodiment of a camera to which the device is applied.

Figure 2:
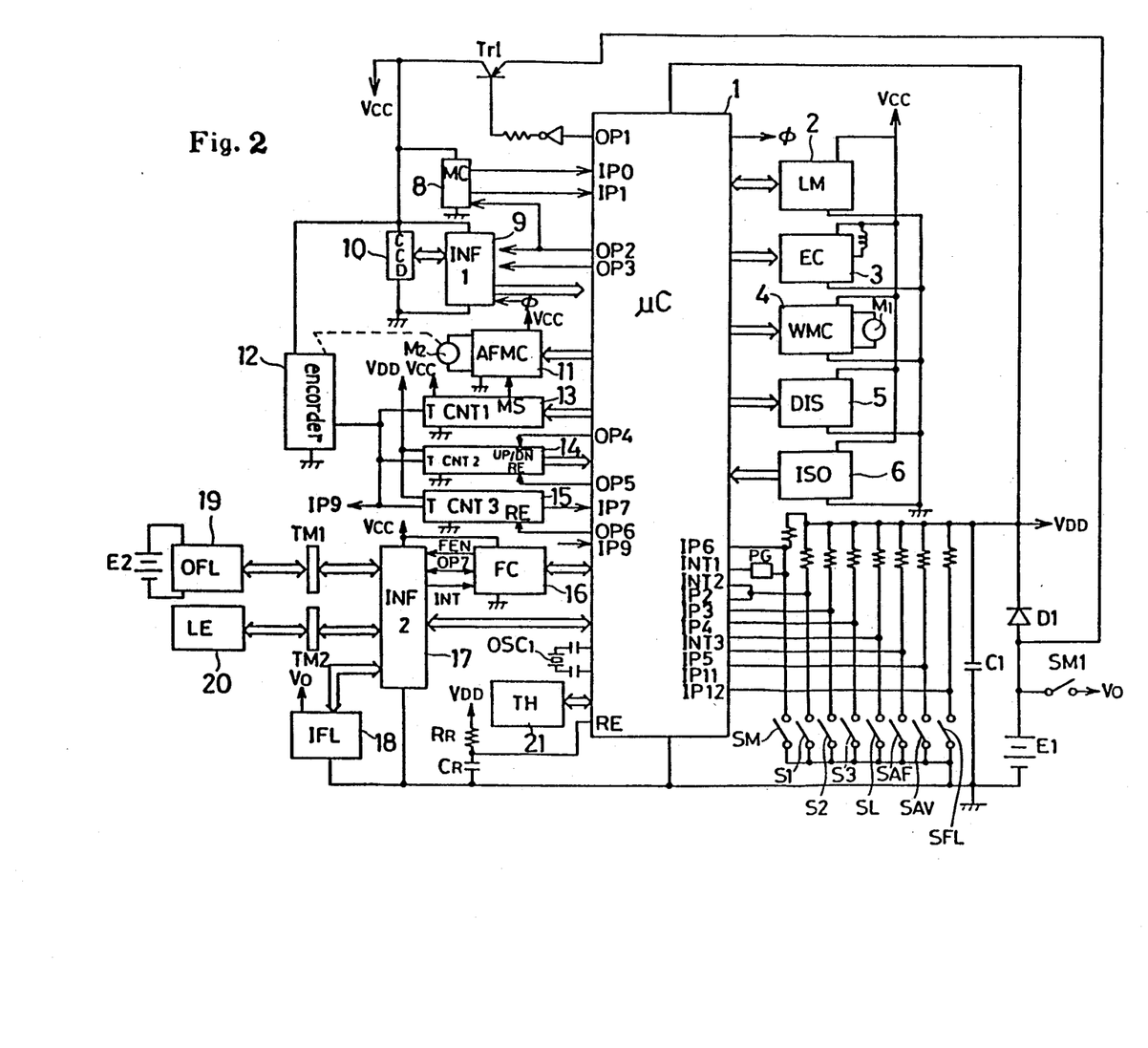
FIG. 2 is a view showing the arrangement of an embodiment of the detecting device according to the present invention.

FIG. 2 is a circuit diagram of the whole camera of this embodiment.

In FIG. 2, numeral 1 indicates a microcomputer which sequentially controlls the whole camera and makes various kinds of calculation. Especially in this embodiment, the microcomputer 1 includes a calculating means for calculating the photographic distance and the image magnification based on the output data from the position detecting means and the focus detecting means respectively, and a correcting means for correcting the output of the position detecting means in accordance with the difference between the basic positions of the position detecting means and the focus detecting means.

Figure 3:
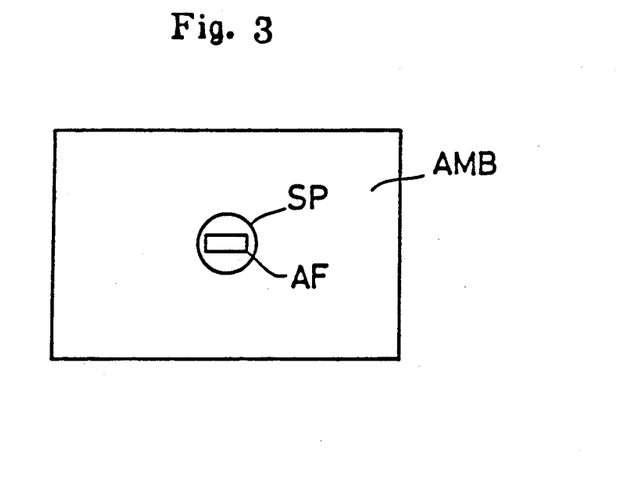
FIG. 3 is a view for explaining a light metering section of the device.

Numeral 2 indicates a light metering circuit for metering the brightness of an object to be photographed and feeding the brightness data BV to the microcomputer 1. The light metering circuit 2 includes spot light metering for metering the brightness of the center of photographing scene. (hereinafter referred to as SP light metering, and the brightness value thereof being referred to as BVSP), and amblient light metering for metering brightness of the whole scene except the abovementioned center (hereinafter referred to as AMB light metering and the brightness value thereof is referred to as BVAM). Thee light metering scopes of these light metering systems will be now described with reference to FIG. 3. In FIG. 3, a peripheral rectangle shows a photographing scene. Inside a circle SP (for example approximately 5 mm in diameter by 35 mm film) at the center is SP light metering scope, and the other part is the scope of AMB light metering scope. A rectangular section AF in SP light metering scope is the focus detecting scope.

Returning to FIG. 2, numeral 3 indicates an exposure control circuit for controlling an aperture and a shutter based on an aperture value and a shutter speed preset or calculated by the microcomputer 1. Numeral 4 indicate a film winding circuit for driving a motor M1 to wind-up one frame of a film, and numeral 5 indicates a display circuit and a display device for displaying photographing data. Numeral 6 indicates a film sensitivity setting circuit for issuing a film sensibility data SV manually preset or obtained by automatically reading a code pattern shown on a film container.

Numerals 8 to 13 indicate circuits used for the automatic focus detection. Numeral 8 indicates a monitor circuit for controlling the charge accumuration time of charge accumulation type CCD 10 and feeding a signal requesting the termination of the charge accumulation and a low brightness signal to input terminals IP1, IP0 of the microcomputer 1 respectively. Numeral 9 indicates an interface circuit for receiving an accumulation starting signal and an accumulation terminating signal fed from output terminals OP2, OP3 of the microcomputer 1 to control the charge accumulation of CCD 10 and at the same time converting analogue data of the CCD 10 to digital data to feed the same to the microcomputer 1. Numeral 11 indicates a motor control circuit for controlling a motor M2 which drives a focusing lens through a coupler (not shown). Numeral 12 indicates an encoder for monitoring the rotation of the motor M2 and issuing pulses which number representing the rotation amount of the motor M2. Numeral 13 indicates a counter which detects the rotation amount of the abovementioned lens driving motor M2 by counting pulses from the encoder 12. In the counter 13, a rotation number (amount) indicative of the defocus amount calculated by the microcomputer 1 is set, and the counter 13 reduces the value of the abovementioned rotation number every time it receives puls from the encoder 12. And when the reduced value reaches 0, the counter 13 feeds a drive stopping signal through a terminal MS to the motor control circuit 11 so as to stop the rotation of the lens driving motor M2.

Numeral 14 indicates an up-down counter (constituting a position detecting means) for monitoring the extension amount of the focusing lens from the most retracted position, and the counter 14 upcounts pulses from the encoder 12 when extending the lens and down-counts the same when retracting. Numeral 15 indicates a counter for counting pulses from the encoder 12 from the state in which the focusing lens is in the most retracted position. The counter 15 feeds a carry signal to an output terminal IP7 when the counted pulse number reaches a predetermined value. Since there is a possibility of an error occuring between the value of the counter 14 for monitoring the abovementioned extension amount and the value of the actual extension amount (which occurs due to a play between a driving mechanism in the photographic lens and the coupler or a slight error of the extension amount with respect to one pulse) increases in proportion to the rotation number of the motor M2, the counter 15 monitors the count number of the pulses and feeds a carry signal to the microcomputer 1 so as to prevent the abovementioned error from increasing. Numeral 16 indicates a light control circuit for controlling the light emitting amount of a flash device 18 (hereinafter referred to as FL device). Numeral 17 indicates an interface circuit INF2 interposed between as inner FL device 18, an outer FL device 19 and a lens circuit 20 in an interchangeable lens 20 and the microcomputer 1. Numeral 21 indicates a temperature sensor comprising a conventional semiconductor sensor.

Figure 4:
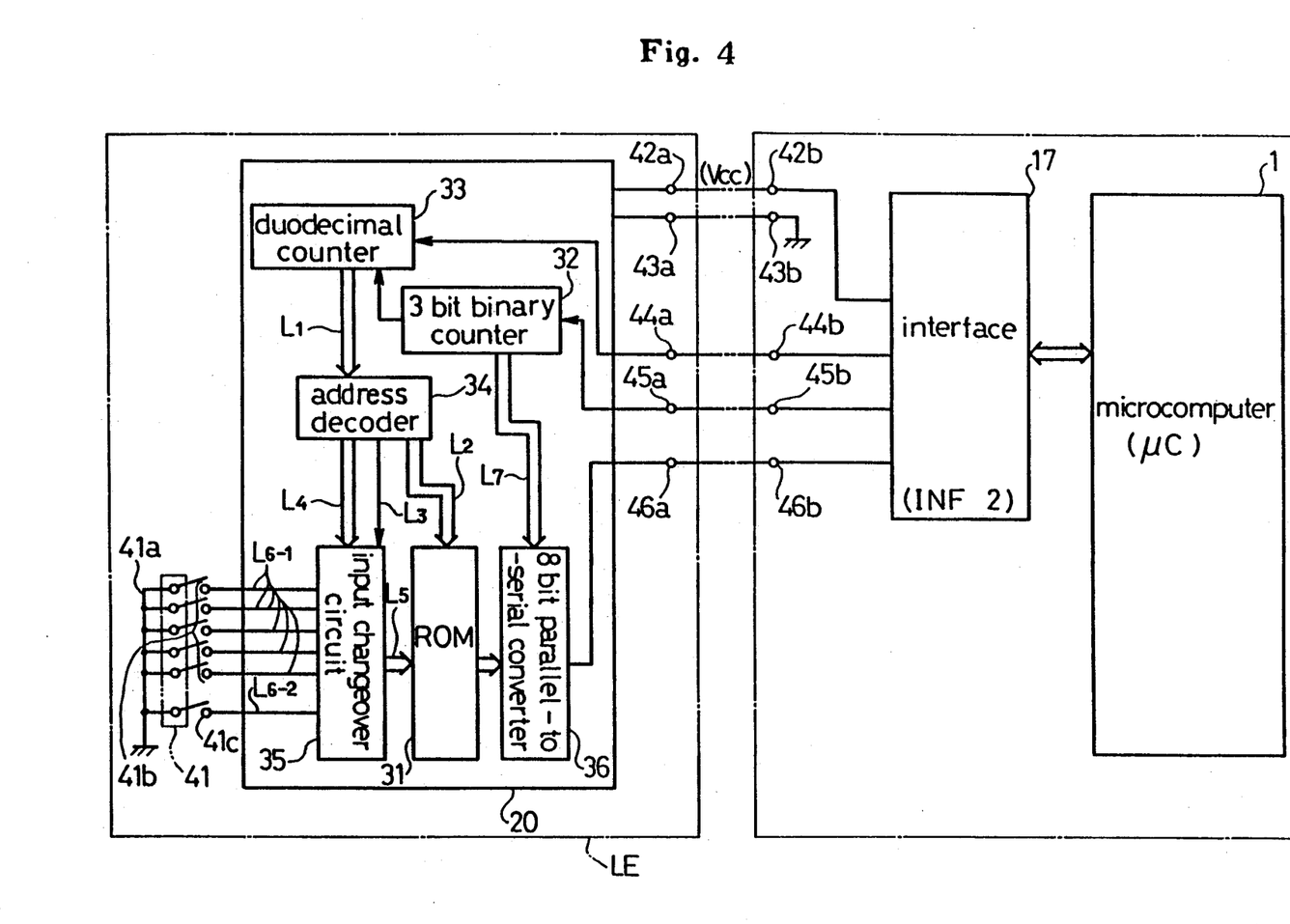
FIG. 4 is a view mainly showing the detailed arrangement of a less circuit section shown in FIG. 2.

Now the arrangement of the lens circuit 20 in the interchangeable lens LE will be described with reference to FIG. 4.

The lens circuit 20 in the interchangeable lens LE comprises ROM 31, a 3 bit binary counter 32, a duodecimal counter 33, an address decoder 34, as input changeover circuit 35 and a 8 bit parallel-to-serial converting circuit 36.

When the microcomputer 1 begins to read data of the lens, the reset signal lowered from 1 to 0 is sent to the lens circuit 33 from the interface circuit (INF2) 17 through signal contact points 44a, 44b. Thereby the duodecimal counter 33 is reset to 0. Thereafter, clock pulses are fed to the 3 bit binary counter 32 from the interface circuit 17 through signal contact points 45a, 45b. The abovementioned 3 bit binary counter 32 feeds 1 pulse per 8 clock pulses input thereto to the duodecimal counter 33 at the following stage. The 3 bit binary counter 32, also controls the timing of issuing data of the interchangeable lens LE serially from the 8 bit parallel-to-serial converting circuit 36 to the interface circuit 17.

The duodecimal counter 33 issues an output signal $L_1$ shown in the following Table 1 according to pulses fed from the 3 bit binary counter 32, to the address decoder 34.

TABLE 1

| Number of pulses input to counter 33 | Output signal L1 |
|---|---|
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |

TABLE 1-continued

| Number of pulses input to counter 33 | Output signal L1 |
|---|---|
| 11 | 1010 |
| 12 | 1011 |

The abovementioned address decoder 34 feeds output signal L for designating address of ROM 31 based on the abovementioned output signal $L_1$. The output signal $L_2$ is used for designating the upper three bits of the eight bits of the ROM 31 and is fed directly to the ROM 31 address, while the output signal $L_4$ is used for designating lower five bits of the eight bits address of the ROM 31 and is fed to the input change over circuit 35.

Lower five bits of the eight bits address can be also set by outer signals $L_{6-1}$, $L_{6-2}$. The outer signal $L_{6-1}$ is a signal corresponding to the focal length when the interchangeable lens LE is a zoom lens having zoom encoder which outputs data representing the set position of a zoom operating ring 41 through zoom encoder contacts 41b. In the case of a fixed focal length lens, the contacts 41b is set to be wholly nonconductive with respect to an earth contact 41a. The other outer signal $L_{6-2}$ is issued from an encorder contact 41c indicating that autofocusing operation is possible or not. The changeover between the signals $L_4$, $L_6$ for designating the lower five bits of ROM 31 is executed inside the input changeover circuit 35 by an output signal $L_3$ from the address decoder 34. And an output signal $L_5$ from the input changeover circuit 35 finally determines the lower five bits of the address of ROM 31.

The input-output relations of the address decoder 34 and the input changeover circuit 35 will be shown in Table 2.

TABLE 2

| $L_1$ | $L_2$ | $L_3$ | $L_4$ | $L_{6-1}$ | $L_{6-2}$ | $L_5$ |
|---|---|---|---|---|---|---|
| 0000 | 000 | 00 | 00000 | $a_4a_3a_2a_1a_0$ | b | 00000 |
| 0001 | 001 | 01 | 00001 | $a_4a_3a_2a_1a_0$ | b | $a_4a_3a_2a_1a_0$ |
| 0010 | 010 | 01 | 00010 | $a_4a_3a_2a_1a_0$ | b | $a_4a_3a_2a_1a_0$ |
| 0011 | 000 | 00 | 00011 | $a_4a_3a_2a_1a_0$ | b | 00011 |
| 0100 | 011 | 01 | 00100 | $a_4a_3a_2a_1a_0$ | b | $a_4a_3a_2a_1a_0$ |
| 0101 | 000 | 00 | 00101 | $a_4a_3a_2a_1a_0$ | b | 00101 |
| 0110 | 000 | 10 | 00110 | $a_4a_3a_2a_1a_0$ | b | 0011b |
| 0111 | 100 | 01 | 00111 | $a_4a_3a_2a_1a_0$ | b | $a_4a_3a_2a_1a_0$ |
| 1000 | 000 | 00 | 01000 | $a_4a_3a_2a_1a_0$ | b | 01000 |
| 1001 | 000 | 00 | 01001 | $a_4a_3a_2a_1a_0$ | b | 01001 |
| 1010 | 000 | 00 | 01010 | $a_4a_3a_2a_1a_0$ | b | 01010 |
| 1011 | 000 | 00 | 01011 | $a_4a_3a_2a_1a_0$ | b | 01011 |

$a_0$, $a_1$, $a_2$, $a_3$, $a_4$ and b, represents "0" or "1".

In other words, if $L_3$="00", $L_5=L_4$, and if $L_3$="01", $L_5=L_{6-1}$, and the lower five bits of the address are designated respectively.

Further, if $L_3$="10", the lower 5 to 2 bits are $L_5=L_4$, but only the lowest bit depends upon $L_{6-2}$.

Data stored in the ROM 31 of the lens circuit 20 will be shown in the following Table 3.

TABLE 3

| $L_1$ | upper 3 bits $L_2$ | lower 5 bits $L_5$ | Data content |
|---|---|---|---|
| 0000 | 000 | 00000 | Attachment check code |
| 0001 | 001 | $a_4a_3a_2a_1a_0$ | Fully open aperture value |
| 0010 | 010 | $a_4a_3a_2a_1a_0$ | Maximum aperture value |
| 0011 | 000 | 00011 | Light metering error correction with fully open aperture |
| 0100 | 011 | $a_4a_3a_2a_1a_0$ | Focal length f |
| 0101 | 000 | 00101 | Fully open aperture value for autofocusing |
| 0110 | 000 | 0011b | Data representing possibility of focus detection |
| 0111 | 100 | $a_4a_3a_2a_1a_0$ | Lens movements amount converting coefficient K |
| 1000 | 000 | 01000 | Coefficient A |
| 1001 | 000 | 01001 | $DF_O$ |
| 1010 | 000 | 01010 | $\Delta DF_T$ |
| 1011 | 000 | 01011 | BL |

Returning to FIG. 2, switches will be described. SM is a main switch. The microcomputer 1 is so constructed as not to receive any signal from a photographing preparation switch S1 as long as the switch SM is not in the ON state. By turning the main switch SM from ON to OFF or from OFF to ON, puls is generated from a pulse generating circuit PG. When receiving the pulses, the microcomputer 1 commands the control circuit to retract a focusing lens of the photographic lens to the ∞ basic position and resets the counters 14, 15 so that the position of the lens coincides with the contents of the counters.

When a shutter release button is slightly depressed, photographing preparation switch S1 is turned ON to cause the light metering circuit 2 to initiate the light metering. Upon further depression of the shutter release button beyond a predetermined length, a release switch S2 is turned on with the shutter cocking operation completed, camera exposure is executed. S3 is a timing switch which is turned ON by the completion of the running of a shutter rear curtain of a focal plane shutter and turned OFF when a shutter release mechanism is cocked or charged by the film windup motor M1.

SL is a lens attachment switch which is turned ON when the photographic lens is attached. When the switch SL is turned ON, the microcomputer 1 commands to retract the focusing lens to the ∞ position similarly to the case of operation by the switch SM.

SAF is a switch for changing-over the autofocusing AF and the manual focusing MF·SM1 is a switch which is turned ON and OFF in the interlocked manner with the main switch SM1. The inner FL device 18 is supplied with electric power through the switch SM1 directly from a camera battery E1. SAV is an autoexposure switch which is turned ON when the exposure control mode is set at the autoexposure. SFL is a flash photographing switch which is turned ON when the photographing mode is manually turned from the daylight photographing to the flashlight photographing.

Now, a circuit concering electric sources will be described. The battery E, supplies electric source VDD through a diode D1 to the microcomputers 14 and 15, an electric source $V_0$ through the switch SM1 directly to the inner FL device 18, and electric source Vcc through power source transistor Tr1 to device other than the abovementioned. C1 is a backup capacitor C1 connected series with the microcomputer 1 for backing-up the microcomputer 1. The diode D1 is used for preventing electric charge stored in the backup capacitor C1 from being discharged to the battery E1.

Now, how to obtain the photographic distance and the image magnification in the abovementioned arrangement will be described.

The coefficient A, and K, data $DF_O$, $\Delta DF_T$, BL, and f and the like shown in table 3 are fed to the microcomputer 1 through the interface circuit 17 from the photographic lens LE. The value K indicates a counter pulse number necessary for moving the focusing lens by a unit defocus amount. In the case of a zoom lens, the value K changes in inverse proportion to the square of the focal length set by the zooming operation. In this embodiment. $DF_O$ is represented using the unit $\mu m$. In the case of a zoom lens not allowing enough scope for a focusing lens to move on the $\infty$ side, the change amount of the image forming plane caused by zooming is restricted with a predetermined value. Consequently, if $DF_O$ is represented by the unit $\mu m$, the value changes little and in many times it may be of a constant value through the whole zooming range.

Figure 5:
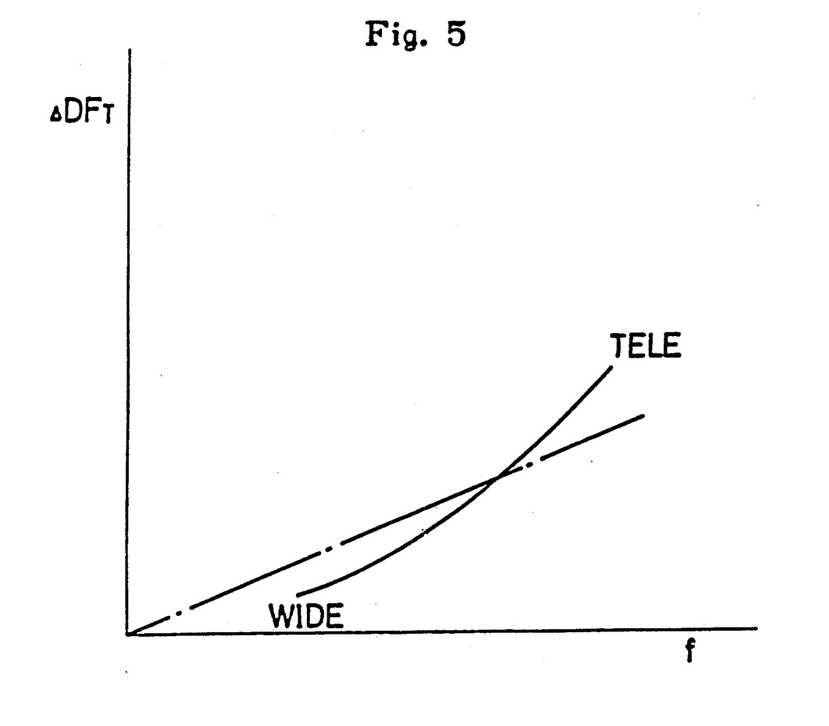
FIG. 5 is a graph showing how the temperature coefficient of the difference between the basic positions of a position detecting means and a focus detecting means changes with zooming.

$\Delta DF_T$ changes much in correspondence with the focal length f in the case of a zoom lens, but it can be approximately represented by a straight line passing the origin in FIG. 5. In this case, data fed from the photographic lens is the gradient C of this straight line which can be of a constant value through the whole zooming range.

$$C=\Delta DF_T(fa)/fa \quad (11)$$

(fa: arbitrary focul length, $\Delta DF(fa)$: $\Delta DF$ value at the focal length fa) and BL is fed by the unit of pulse number.

When an in-focus condition is obtained on an object, the values Dv and $\beta$ can be obtained from the formulas (7)(8) using number of pulses of the counter 14, but before that, it is necessary to add DF correction value to the pulse number n as abovementioned.

If converted pulse number of DF is represented by $\Delta n$, $$\Delta n = K \cdot DK = K (DF_o + \Delta DF_T \times \Delta T)$$

$$= K(DF_o + C \times f \times \Delta T) \quad (12)$$

($\Delta T$: temperature change detected by the temperature sensor 21)

Further, since the backlash BL had to be corrected only when the lens is initially driven to the $\infty$ basic position (in the right direction) and when the lens driving direction is reversed during normal lens driving, the formulas (7), (8) are:

$$Dv = A - 2 \log_2(N - \Delta n + \delta \cdot BL) \quad (13)$$

$$\beta = \frac{f \times (n - \Delta n + \delta \cdot BL) \times 10^{-3}}{2^{A/2}} \quad (14)$$

$$\begin{cases} \delta = -1 \text{ (when driven in the reverse direction)} \\ \delta = 0 \text{ (when driven in the right direction)} \end{cases}$$

Further, how to obtain the values Dv and $\beta$ before bringing the focusing lens in in-focus will be now described.

As abovementioned, a certain number of pulses is fed to the counter 13 in correspondence with the obtained defocus amount. If the pulse number is represented by $\Delta n'$ and the pulse number which has been counted in correspondence with the lens movement amount is represented by n, the formula (13), (14) are represented by the following formulas (15), (16) and thereby Dv and $\beta$ with respect to an object to which distance is to be measured can be obtained before bringing the focusing lens in in-focus.

$$Dv = A - 2 \log_2(n - \Delta n \pm \Delta n' + \delta \cdot BL) \quad (15)$$

$$\beta = \frac{f \times (n - \Delta n \pm \Delta n' + \delta \cdot BL) \times 10^{-3}}{2^{A/2}} \quad (16)$$

Now, another embodiment will be described in which data $DF_O \times K$ and $\Delta DF_T \times K$ instead of $DF_O$ and $\Delta DF_T$ are fed from the lens circuit 20 to the microcomputer 1. In this embodiment, $DF_O$ and $\Delta DF_T$ which are defocus amounts ($\mu m$) are converted to pulse numbers by multiplying the value K. As a result, the formula (12) is represented by the following formula.

$$\Delta n = K \cdot DF_O + K \cdot \Delta DF_T \times \Delta T$$

Accordingly, the calculation by the computer 1 can be simplified due to the omission of multiplying K value. The formula (13) and the succeeding formulas are similar to the abovementioned.

When a zoom lens can be afforded a focusing lens to move in an enough scope, the value $K \times DF_O$ is kept constant irrespective of zooming, in spite of the value $DF_O$ varying very much. Further, when $\Delta DF$ can be approximately represented by $\Delta FT \propto f^2$, the value $\Delta DF_T \times K$ is kept constant irrespective of zooming since $K \propto 1/f^2$. When data much varying with zooming are to be transferred from a zoom lens, they have to be changed by means of an encoder and ROM. However, according to the system of this embodiment, such changing of data is not necessary, which is advantageous in data processing.

Now, a case will be described in which detected distance data Dv and the image magnification $\beta$ are used for controlling the exposure. In this case, the image magnification $\beta$ is used so that the exposure calculation is changed in accordance with the image magnification $\beta$. In other words, it is supposed that a main object to be mainly photographed is a person's face, and the method of exposure calculation is changed over by judging whether the image magnification is so large as capable of metering the brightness of the person's face at the spot light metering section, or it is too small to meter at the spot light metering section because of a light of the background intruding in the section.

When the image magnification at this changing-over point is set, for example, at 1/30, and if $\beta \geq 1/30$, a distance detected object (e.g. a person) may be assumed an object to be photographed, and accordingly, the spot brightness value BVSP is adopted.

If $\beta < 1/30$, often the whole scene is photographed as scenery photographing, the average brightness value BVAV is adopted. Correct exposures suitable for the intention of a photographer at photographing can be obtained in such a manner.

Relating to the flash light photographing, the aperture value AVFL suitable for the flash light photography is obtained from the following formula:

$$AVFL = SV + IV - DV$$

(SV: film sensitivity, IV; light emission amount, DV; distance data).

The value AVFL equal to or larger than the fully open aperture value of a photographic lens means the object being correctly exposed in flash light photographing.

The value AVFL smaller than the fully open aperture value means causing under exposure for flash light photographing. In such a case, flash light photographing is forbidden and at the same time a warning is displayed, whereby erroneous photographing can be prevented. While the embodiments of the present invention, as herein disclosed, constitute a preferred form, it is to be understood that other forms might be adopted.

What is claimed is:

1. A device for detecting photographic distance or image magnification comprising:
   a photographic lens including a focusing lens having movable scope on the infinity side thereof, said focusing lens being movable beyond an optical infinity position of said focusing lens to a most retracted position;
   a position detecting means for detecting an extension amount of said focusing lens from the most retracted position;
   means for correcting said extension amount; and
   means for issuing a signal corresponding to photographic distance or image magnification based on the corrected extension amount of said focusing lens detected by said position detecting means.

2. A device for detecting the photographic distance or the image magnification as claimed in claim 1 further comprising:
   focus detecting means for detecting a defocus amount representing a distance between an expected image-forming position and an actual image-forming position; and
   wherein the issuing means issues a signal corresponding to the photographic distance or the image magnification based on
   a first data A peculiar to the photographic lens and relating to the focal length thereof,
   a second data n output from the position detecting means and representing the extension amount of the focusing lens from the infinity basic position, and
   a third data DF representing the amount of difference between the infinity basic positions of the position detecting means and the focus detecting means.

3. A device for detecting the photographic distance or the image magnification as claimed in claim 2, wherein the issuing means issues a signal corresponding to the photographic distance or the image magnification further based on a fourth data representing the backlash of the position detecting means and the focusing lens.

4. A device for detecting the photographic distance or the image magnification ass claimed in claim 2, wherein the third data is obtained from the following formula:

$$DF = DF_O + \Delta DF_T \times \Delta T$$

wherein
$DF_O$ is DF value at the normal temperature at the $\infty$ basic position,
$\Delta DF_T$ is temperature coefficient of DF, and
$\Delta T$ is temperature difference with respect to the normal temperature.

5. A device for detecting the photographic distance or the image magnification as claimed in claim 4, wherein in the case of a zoom lens. $\Delta DF_T$ is represented by a temperature coefficient at an arbitrary focal length.

6. A device for detecting the photographic distance or the image magnification as claimed in claim 2 wherein n is the pulse number and the correcting means issues DF data converted into the pulse number.

7. A device for detecting the photographic distance or the image magnification as claimed in claim 1, wherein the issuing means issues a signal corresponding to the photographic distance or the image magnification based on
   a first data A peculiar to a photographic lens and relating to the focal length thereof,
   a second data n issued output from the position detecting means and representing the extension amount of the focusing lens from the infinity basic position, and
   a third data BL representing the backlash of the position detecting means and the focusing lens.

8. A device for detecting the photographic distance or the image magnification as claimed in claim 7, wherein data $BL = \delta \cdot BL$, and when the focusing lens is moved in one direction, $\delta = 0$.

9. A device for detecting the photographic distance or the image magnification as claimed in claim 8 wherein when the focusing lens is moved in the other direction, $\delta = 1$.

10. A device for detecting photographic distance or image magnification as claimed in claim 1, wherein said correcting means corrects said extension amount based on the temperature, said position detecting means taking into consideration an extra value beyond an optical infinity position of said focusing lens in the most retracted position.

11. A device for detecting photographic distance or image magnification as claimed in claim 1, wherein said issuing means calculates the photographic distance or the image magnification based on the detected amount of movement.

12. A device for detecting photographic distance or image magnification as claimed in claim 1, wherein said position detecting means includes a pulse generator which outputs pulses in conjunction with the movement of said focusing lens, number of which pulses representing the amount of movement of said focusing lens from the most retracted position.

13. A device for detecting distance or image magnification comprising:
   a photographic lens including a focusing lens, said focusing lens being movable beyond an optical infinity position of the focusing lens to a most retracted position;
   a position detecting means for detecting an extension distance of said focusing lens from the most retracted position;
   means for correcting said extension distance based on a backlash of said position detecting means and said focusing lens; and
   means for issuing a signal corresponding to photographic distance or image magnification based on the corrected extension distance of said focusing lens.

14. The device of claim 13 wherein said correcting means additionally corrects said extension distance based on a detected temperature.

* * * * *